(12) United States Patent
Fukumoto et al.

(10) Patent No.: US 6,493,296 B1
(45) Date of Patent: Dec. 10, 2002

(54) OPTICAL DISC INCLINATION DETECTING METHOD, OPTICAL PICKUP DEVICE, AND OPTICAL DISC DEVICE

(75) Inventors: Atsushi Fukumoto, Kanagawa (JP); Shinichi Kai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/431,839

(22) Filed: Nov. 2, 1999

(30) Foreign Application Priority Data

Nov. 10, 1998 (JP) .......................................... 10-319356

(51) Int. Cl.$^7$ ............................................... G11B 7/095
(52) U.S. Cl. ................................. 369/44.32; 369/53.19
(58) Field of Search ............................ 369/44.32, 53.19

(56) References Cited

U.S. PATENT DOCUMENTS

| | | | |
|---|---|---|---|
| 4,663,751 A | * 5/1987 | Kaku et al. | |
| 4,787,076 A | * 11/1988 | Deguchi et al. | |
| 5,172,355 A | * 12/1992 | Nagahara et al. | ........ 369/44.32 |
| 5,191,571 A | 3/1993 | Fukumoto et al. | ........ 369/44.37 |
| 5,353,277 A | 10/1994 | Yasuda et al. | ............ 369/275.4 |
| 5,367,509 A | 11/1994 | Fukumoto et al. | ............. 369/13 |
| 5,434,834 A | * 7/1995 | Shinoda et al. | ...... 369/44.32 X |
| 5,473,154 A | 12/1995 | Eguchi et al. | ............ 250/201.5 |
| 5,623,461 A | 4/1997 | Sohmuta | |
| 5,828,637 A | 10/1998 | Kim | |
| 6,246,648 B1 | * 6/2001 | Kuribayashi | ............. 369/44.32 |

FOREIGN PATENT DOCUMENTS

| | | |
|---|---|---|
| JP | 8-255360 | 10/1996 |
| JP | 9-212891 | 8/1997 |
| JP | 9-245357 | 9/1997 |

* cited by examiner

*Primary Examiner*—W. R. Young
(74) *Attorney, Agent, or Firm*—Oblon, Spivak, McClelland, Maier & Neustadt, P.C.

(57) ABSTRACT

An optical disc inclination detecting method for detecting an inclination angle of an optical disc with respect to a light spot, for recording information or reproducing information by irradiating the light spot on the optical disc by an optical pickup. The method includes dividing the light spot into a main spot and both side spots in a specified track and track crossing directions before and after the specified track, detecting signals corresponding to a reflected light from the optical disc by photo detectors corresponding to the main spot and both side spots, and generating a DPP (differential push-pull) signal from signals corresponding to the main spot and both side spots. The method also generates a DPD (differential phase direction) signal by comparing phases from the signals corresponding to the main spot, determining a differential operation value of the DPP and DPD signals, and detecting the inclination angle of the optical disc based on the differential operation value.

10 Claims, 6 Drawing Sheets

OPTICAL DISC INCLINATION DETECTING METHOD, OPTICAL PICKUP DEVICE, AND OPTICAL DISC DEVICE

BACKGROUND OF THE INVENTION

1. Field of the Invention

The present invention relates to an optical disc inclination detecting method, an optical pickup device, and an optical disc device, and is applicable to detection of inclination of a disc when recording or reproducing information recorded on a disk-shaped recording medium, such as a magneto-optical disc (MO), a compact disc (CD), a compact disc-recordable (CD-R), and a digital video disc (DVD).

2. Description of the Related Art

In the field of optical discs, recently, in additional to the conventional CD format, optical discs of various formats are present, including the optical disc-recordable (CD-R) coated with a pigment film of organic pigment system, magneto-optical disc (MO), phase variable optical disc (DVD-RAM) and the like.

In the recording and reproducing apparatus of such optical discs, it is designed to control the radial tilt angle indicating the inclination of the optical disc in the radial direction with respect to the light spot emitted from the optical pickup. As the recording density is enhanced, it is required much to detect the radial tilt of the optical disc precisely and assure the reliability by radial tilt control of optical disc.

In such optical disc recording and reproducing apparatus, when detecting the radial tilt of optical disc, a tilt sensor having a reflection type sensor is mounted, for example, on the optical pickup, and the radial tilt is detected from the difference in the quantity of reflected light when the optical pickup is moved in the radial direction of the optical disc.

Japanese Laid-open Patent No. 8-255360 disclosed an optical disc device capable of removing a DC offset by detecting the reflected light from the optical disc with two photo detectors, generating a differential signal, detecting the envelope of the detection signal to detect the differential component, and further controlling the tracking from their difference.

Japanese Laid-open Patent No. 9-212891 discloses an optical head device for dividing the laser light into a main luminous flux and a subsidiary luminous flux, generating rush-pull signals individually from them, and generating a tilt signal corresponding to the disc tilt from these push-pull signals. Also, japanese Laid-open Patent No. 9-245357 discloses a servo control device of an optical disc recording and reproducing apparatus for converting from a push-pull signal and a phase difference detection signal into a detracking signal and a radial tilt signal, to thereby controlling the tracking servo and the sled servo.

In the optical disc recording and reproducing apparatus using such conventional tilt sensor, since the optical pickup and the tilt sensor cannot be placed at the same position in the optical disc radial direction, the position in the optical disc radial direction detected by the tilt sensor and the focal position of the optical pickup are different, and a correct tilt angle of the disc with respect to the optical pickup cannot be obtained. Besides, since the tilt sensor is mounted on the optical pickup, the optical pickup is increased in size.

In Japanese Laid-open Patent No. 8-255360, in order to remove the DC offset components, since it was necessary to adjust the balance by fine adjustment of the gain when subtracting the push-pull signal of one beam, the adjustment was complicated, and the precision was lowered unless the adjustment was appropriate. In Japanese Laid-open Patent No. 9-212891, since the gain was adjusted after assuming up the two push-pull signals of the subsidiary luminous flux and the offset signal was generated by adding it to the push-pull signals of the main luminous flux, the gain adjustment was complicated, and the precision was lowered unless the adjustment was appropriate. In Japanese Laid-open Patent No. 9-245357, since the radial tilt signal was converted by amplifying the push-pull signal and the phase difference detection signal of one beam to specified levels respectively, the gain adjustment was complicated, and the precision was lowered unless the adjustment was appropriate.

SUMMARY OF THE INVENTION

The present invention is devised in the view of the aforesaid problems, and it is hence an object thereof to present an optical disc inclination detecting method, an optical pickup device, and an optical disc device capable of detecting the radial tilt of optical disc at high precision by a simple constitution.

To solve the problems, the optical disc inclination detecting method of the present invention is an optical disc inclination detecting method for detecting the inclination angle of an optical disc with respect to a light spot, for recording information or reproducing information by irradiating the light spot on an optical disc by an optical pickup, comprising the steps of dividing the light spot into a main spot and both side spots on a specified track and track crossing directions before and after the same, generating, from the reflected light from the optical disc, a first signal by subtracting or adding the detection signals from split photo detectors or light receiving units of the main spot and both side spots or in the track crossing direction of both side spots generating a second signal by comparing the phase of the detection signals from the split photo detectors in the direction orthogonal to the track crossing direction of the main spot, determining a differential operation value of the first signal and the second signal, and detecting the inclination angle of the optical disc on the basis of the differential operation value.

The optical pickup device of the invention is an optical pickup device for detecting the inclination angle of an optical disc with respect to a light spot, for recording information or reproducing information by irradiating the laser spot on the optical disc, comprising an inclination angle detecting unit in which the light spot is divided into a main spot and both side spots in a specified track and in the track crossing direction before and after the same, a first signal is generated from the reflected light from the optical disc by subtracting or adding the detection signals from split photo detectors of the main spot and both side spots or in the track crossing direction of both side spots, a second signal is generated by comparing the phases of the detection signals from the split photo detectors or light receiving units in the direction orthogonal to the track crossing direction of the main spot, a differential operation value of the first signal and the second signal is determined, and the inclination angle of the optical disc is detected on the basis of the differential operation value, and a correcting unit which corrects the inclination angle of the optical disc with respect to the light spot depending on the inclination angle.

Further, the optical disc device of the invention is an optical disc device for detecting the inclination angle of an optical disc with respect to a light spot, for recording information or reproducing information by irradiating the laser spot on the optical disc by an optical pickup, comprising an inclination angle detecting unit in which the light spot is divided into a main spot and both side spots in a specified track and in the track crossing direction before and after the same, a first signal is detected from the reflected light from the optical disc by subtracting or adding the detection signals from split photo detectors or light receiving units of the main spot and both side spots or in the track crossing direction of both side spots, a second signal is generated by comparing the phases of the detection signals from the split photo detectors in the direction orthogonal to the track crossing direction of the main spot, a differential operation value of the first signal and the second signal is determined, and the inclination angle of the optical disc is detected on the basis of the differential operation value, and a correcting unit which corrects the inclination angle of the optical disc with respect to the light spot depending on the inclination angle.

The optical disc device of the invention brings about the following actions.

The laser beam emitted from an optical pickup of an optical system is irradiated on an optical disc which is controlled in rotation by a spindle servo system. Focus servo is effected by a focusing coil of a biaxial actuator of the optical system which is controlled by a focus servo system, and also tracking servo is effected by a tracking coil of the biaxial actuator.

The reflected light from the optical disc is detected by split photo detectors or light receiving units of a servo signal detecting system, a first signal and a second signal are generated by using detection signals from the split photo detectors, and the difference between the first signal and the second signal is calculated to determine the inclination angle of the disc. The detected disc inclination angle is corrected by a correction unit.

DETAILED DESCRIPTION OF THE PREFERRED EMBODIMENT

Referring now to the drawings, an optical disc device according to a preferred embodiment of the invention will be described in detail below.

Figure 1:
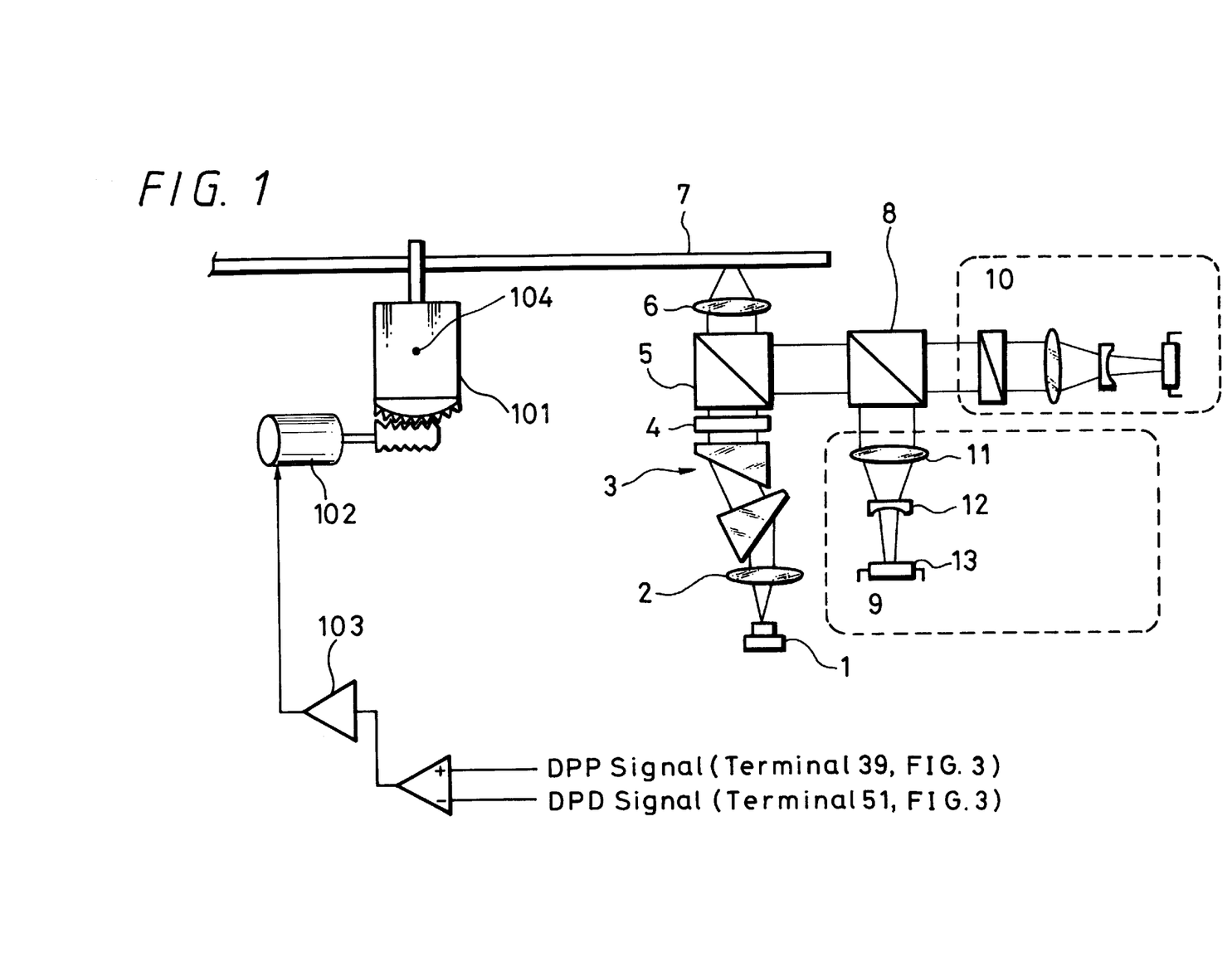
FIG. 1 is a diagram showing a constitution of an optical system according to an embodiment of the invention.

FIG. 1 is a diagram showing a constitution of an optical system of an optical pickup of an optical disc device according to an embodiment of the present invention.

In FIG. 1, a light emitted from a laser 1 is made by a collimator lens 2 to be a parallel light, and the elliptical luminous flux is shaped into a circular luminous flux by an anamorphic prism 3, and the astigmatism is corrected at the same time. Further, the shaped luminous flux is polarized by a grating 4 into an order 0 light as a main spot, and an order +1 light and an order −1 light as both side spots, and passed through a beam splitter (1) 5, focused by an objective lens 6 and irradiated on an optical disc 7.

The optical path of the light reflected on the optical disc 7 is once reflected by the beam splitter (1) 5, and is divided by a beam splitter (2) 8 into a servo signal detection system 9 by reflection and an RF signal detection system 10 by transmission. In the servo signal detection system 9, the luminous flux is focused by a focusing lens 11, and is further focused on a photo detector 13 by means of a multi-lens 12. In the RF signal detection system 10, similarly, the luminous flux is focused by the focusing lens, and is further focused on the photo detector by the multi-lens.

Figure 2A:
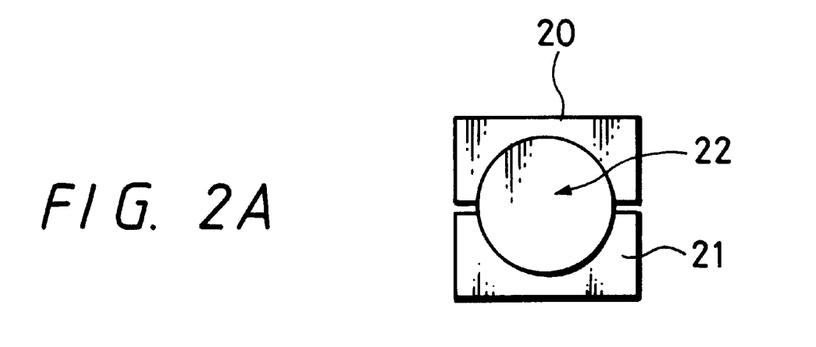
FIG. 2A, FIG. 2B, and FIG. 2C are respectively diagrams showing the detector patterns and the spots of the embodiment.
Figure 2B:
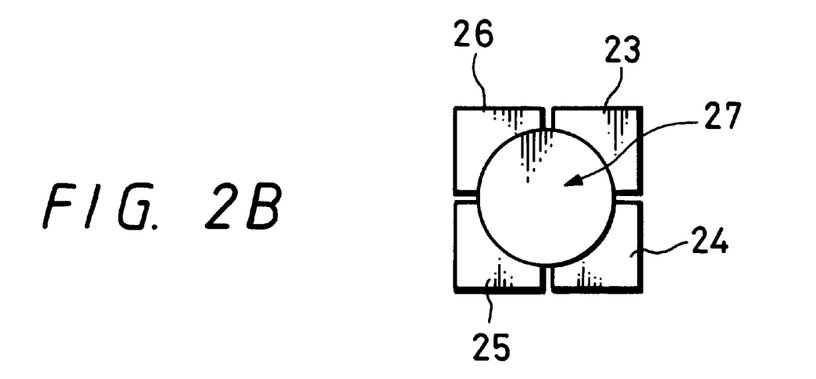
Figure 2C:
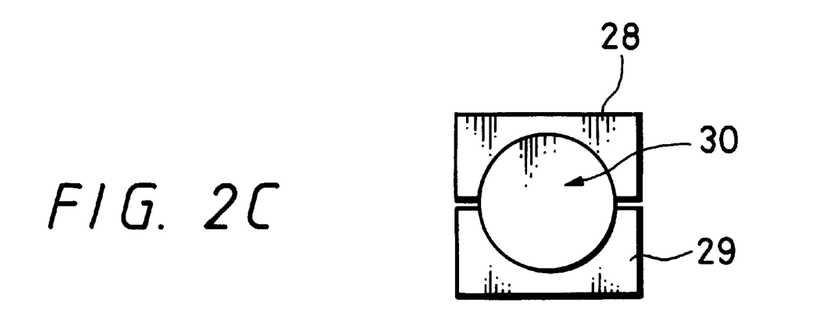

FIG. 2 shows the detector pattern and the spot of the embodiment.

The detector consists of a four-division photo detector unit of detectors A23, B24, C25, D26 in FIG. 2B; a two-division photo detector unit of E21, F20 in FIG. 2A; and a two-division photo detector unit of G29, H28 in FIG. 2C.

A main spot 27 is made incident upon the four-division photo detector unit of detectors A23, B24, C25, D26, and a side spot (1) 22 and a side spot (2) 30 respectively are incident upon the two-division photo detector unit of E21, F20, two-division photo detector unit of G29, H28. On the disc, meanwhile, since the main spot 27 and side spot (1) 22 and side spot (2) 30 are shifted in the radial direction by a half of the track pitch, the push-pull signals of the main spot 27 and both the side spots (1) 22, (2) 30 are deviated in phase by 180 degrees each.

Figure 3:
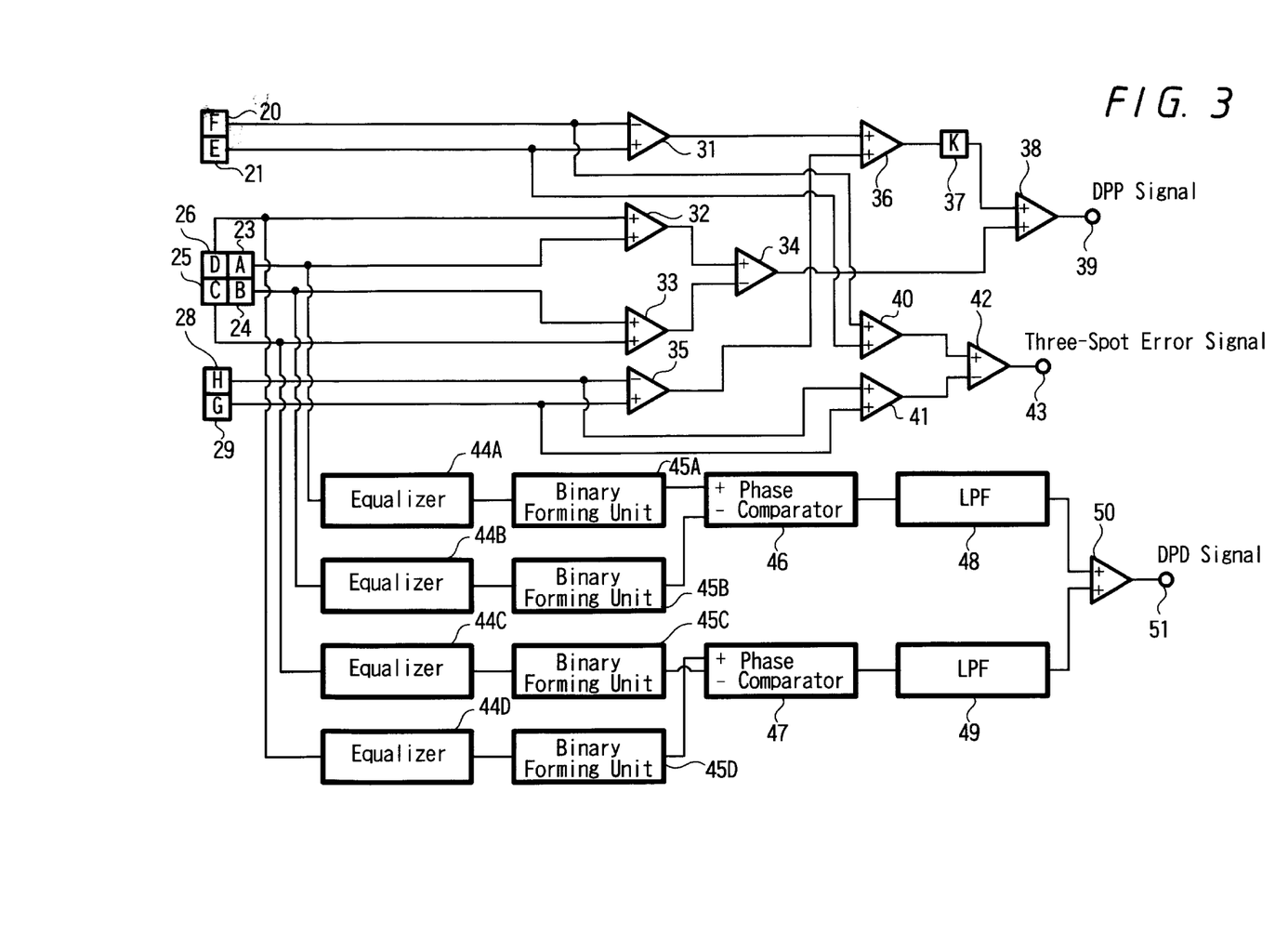
FIG. 3 is a block diagram showing generation of a DPP signal, a three-spot error signal and a DPD signal of the embodiment.

FIG. 3 is a diagram showing generation of a DPP signal, a three-spot error signal, and a DPD signal in the embodiment.

First, the generation of DPP signal is described. If the disc contains an embossed groove and a pit recorded mark, the DPP signal is generated as follows.

In FIG. 3, outputs of two-division photo detector unit of detectors E21, F20 (respectively referred to as E and F) are put into a non-inverted input terminal and an inverted input terminal of a subtractor 31, respectively, and (E−F) is operated by the subtractor 31. Outputs of two-division photo detector unit of detectors G29, H28 (respectively referred to as G and H) are put into a non-inverted input terminal and an inverted input terminal of a subtractor 35, and (G−H) is operated by the subtractor 35. These results (E−F) and (G−H) are put into addition input terminals of an adder 36, respectively, and the operation of (E−F)+(G−H) is performed by the adder 36. The sum of (E−F)+(G−H) is amplified k times by an amplifier 37, and the product k{(E−F)+(G−H)} is put into one addition input terminal of an adder 38.

Outputs of detectors A23, D26 of the four-division photo detector unit of detectors A23, B24, C25, D26 are put into an addition input terminal of an adder 32, and (A+D) is operated by the adder 32. Outputs of detectors B24 and C25 are put into an addition input terminal of an adder 33, and (B+C) is operated by the adder 33. The sum (A+D) is put into an non-inverting input terminal of a subtractor 34, and the sum (B+C) is put into an inverting input terminal of the subtractor 34. The operation of (A+D)−(B+C) is performed by the subtractor 34. The result {(A+D)−(B+C)} is put into other addition input terminal of the adder 38. The adder 38 operates $\{(A+D)-(B+C)\}+k\{(E-F)+(G-H)\}$, and DPP signal $=\{(A+D)-(B+C)\}+k\{(E-F)+(G-H)\}$ is issued to a terminal 39. Herein, k is a constant for equalizing the amplitudes of $\{(A+D)-(B+C)\}$ and $\{(E-F)+(G-H)\}$ so that an offset may not be caused in the DPP signal if the viewing field of the objective lens 6 is shifted by the tracking coil of the biaxial actuator, not shown, at the time of tracking.

Next, the three-spot error signal is described. In FIG. 3, the outputs E, F of the two-division photo detector unit of detectors E21, F20 are fed into addition input terminals of an adder 40, respectively, and the adder 40 operates (E+F). Outputs G, H of the two-division photo detector unit of detectors G29, H28 are fed into addition input terminals of an adder 41, respectively, and the adder 41 operates (G+H). The sums (E+F) and (G+H) are respectively put into a non-inverting input terminal and an inverting input terminal of a subtractor 42, and the subtractor 42 operates (E+F)−(G+H). To a terminal 43, a three-spot error signal=(E+F)−(G+H) is issued.

Generation of DPD signal is described next. If there are embossed pits and recorded marks on the disc, the DPD signal is generated as follows.

In FIG. 3, outputs A, B, C, D of the four-division photo detector unit of detectors A23, B24, C25, D26 Are put into equalizing circuits 44A, 44B, 44C, 44D, respectively, and are equalized, and then converted into binary values in binary forming circuits 45A, 45B, 45C, 45D. Outputs of the binary forming circuits 45A, 45B are compared in a phase comparator 46, and a pulse train P (A−B) is generated, and is shaped by a low pass filter (LPF) 48, and put into one input terminal of an adder 50. Outputs of the binary forming circuits 45D, 45C are compared in a phase comparator 47, and a pulse train P (D−C) is generated, and is shaped by a low pass filter (LPF) 49, and put into other input terminal of the adder 50. The adder 50 operates $\{P(A-B)+P(D-C)\}$, and a DPD signal=$\{P(A-B)+P(D-C)\}$ is issued to a terminal 51.

Figure 4:
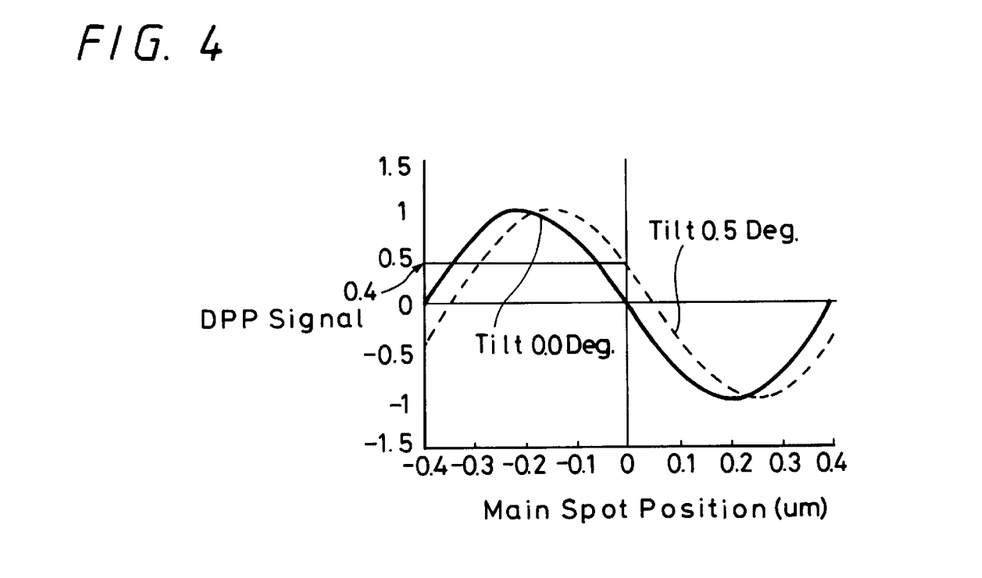
FIG. 4 is a graph showing the DPP signal level corresponding to the position of the main spot of the embodiment.

FIG. 4 is a graph showing a DPP signal level with respect to the position of main spot of this embodiment. The graph shown in FIG. 4 shows the calculated values of the DPP signal corresponding to the position of the main spot in the case without a disc tilt indicated by a solid line and in the case having a disc tilt indicated by a broken line. In FIG. 4, in the case where the disc is free from the radial tilt as indicated by the solid line, when the main spot is positioned at 0 showing right above the track center as shown on the axis of abscissas, the DPP signal is 0 as shown on the axis of ordinates. However, if there is the radial tilt as indicated by the broken line, an offset occurs, and when the main spot is right above the track center, the DPP signal is 0.4, not 0, and the DPP signal becomes 0 when the main spot is deviated from right above the track center by about 0.05 $\mu$m.

Figure 5:
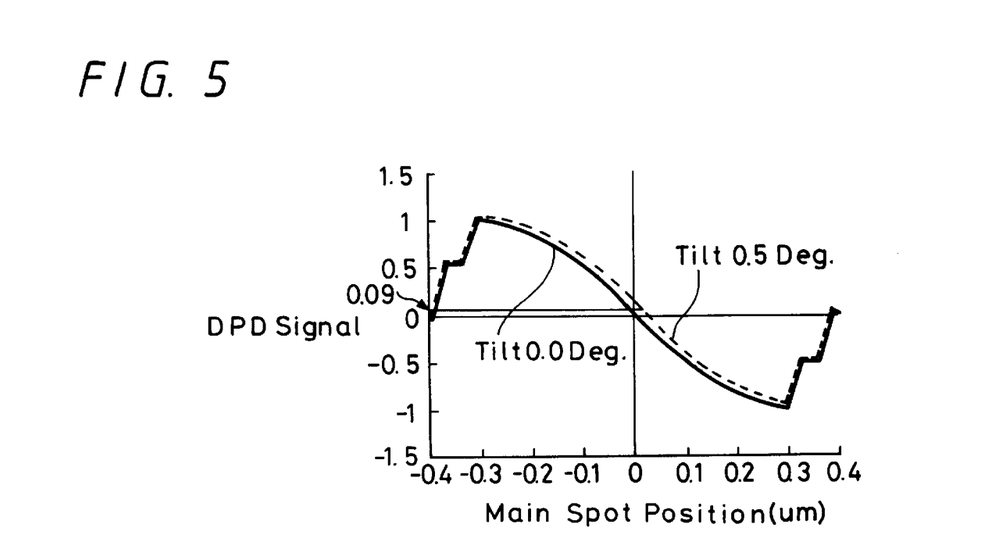
FIG. 5 is a graph showing the DPD signal level corresponding to the position of the main spot of the embodiment.

FIG. 5 is a graph showing a DPD signal level with respect to the position of main spot of this embodiment. The graph shown in FIG. 5 shows the calculated values of the DPD signal corresponding to the position of the main spot in the case without a disc tilt indicated by a solid line and in the case having a disc tilt indicated by a broken line. In FIG. 5, in the case where the disc is free from the radial tilt as indicated by the solid line, when the main spot is positioned at 0 showing right above the track center as shown on the axis of abscissas, the DPP signal is 0 as shown on the axis of ordinates. However, if there is a radial tilt as indicated by the broken line, an offset occurs, and when the main spot is right above the track center, the DPP signal is 0.09, not 0, and the DPD signal becomes 0 when the main spot is deviated from right above the track center by about 0.02 $\mu$m. Thus, in the case of the DPD signal, it is known that the offset due to disc tilting is considerably small as compared with the case of DPP signal.

For example, in the case of an optical pickup with the wavelength of 650 nm and the numerical aperture (NA) of 0.7, if the disc thickness is 0.6 $\mu$m, the track pitch is 0.8 $\mu$m, and the mark length is 0.5 $\mu$m, supposing the radial tilt of the disc to be 0.5 deg., when the main spot is right above the track center, the offset amounts of the DPP signal and DPD signal are 0.40 and 0.09, respectively, provided each amplitude is 1.

Therefore, if the disc has a radial tilt, a difference is cause between the DPP signal and the DPD signal standardized by each amplitude. The larger the disc tilt angle, the larger is the difference between the DPP signal and the DPD signal, so that this value can be utilized in detection of the radial tilt angle of the disc with respect to the optical pickup.

Figure 6:
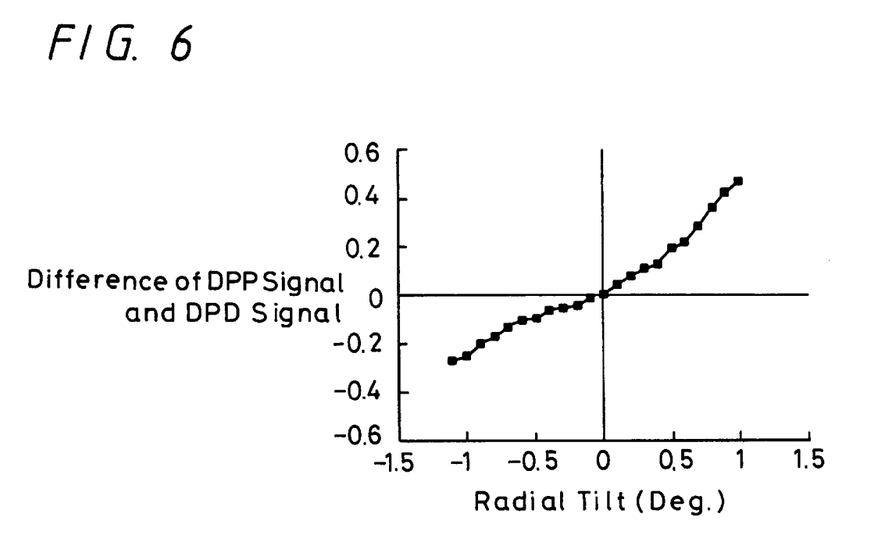
FIG. 6 is a graph showing the difference of DPP signal and DPD signal with respect to the radial tilt of the embodiment.

FIG. 6 is a graph showing the difference between the DPP signal and the DPD signal with respect to the radial tilt in the embodiment. The graph shown in FIG. 6 shows the experimental values of the difference of DPP signal and DPD signal with respect to the radial tilt of the disc. In FIG. 6, as the radial tilt of the disc shown on the axis of abscissas increases, the difference between the DPP signal and the DPD signal shown on the axis of ordinates increases proportionally. Herein, the tracking is effected by using the DPD signal.

Figure 7:
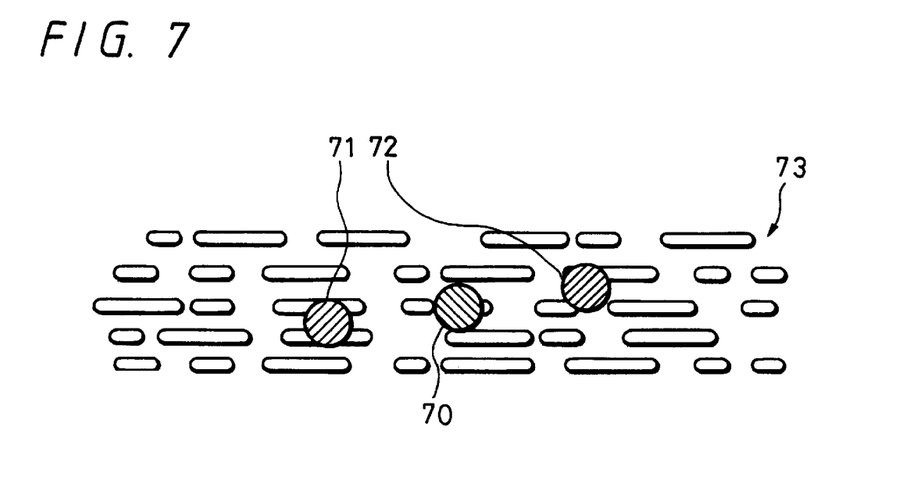
FIG. 7 is a diagram showing detection of disc tilt in the read-only disc of the embodiment.

FIG. 7 is a diagram showing detection of a disc tilt in a read-only disc in the embodiment. When reproducing the read-only disc composed of pit rows 73 on the entire surface as shown in FIG. 7, by detecting the difference between the DPD signal obtained from a main spot 70, and the DPP signal obtained from the main spot 70 and both side spots 71, 72, the tilting of the disc with respect to the optical pickup can be detected.

Figure 8:
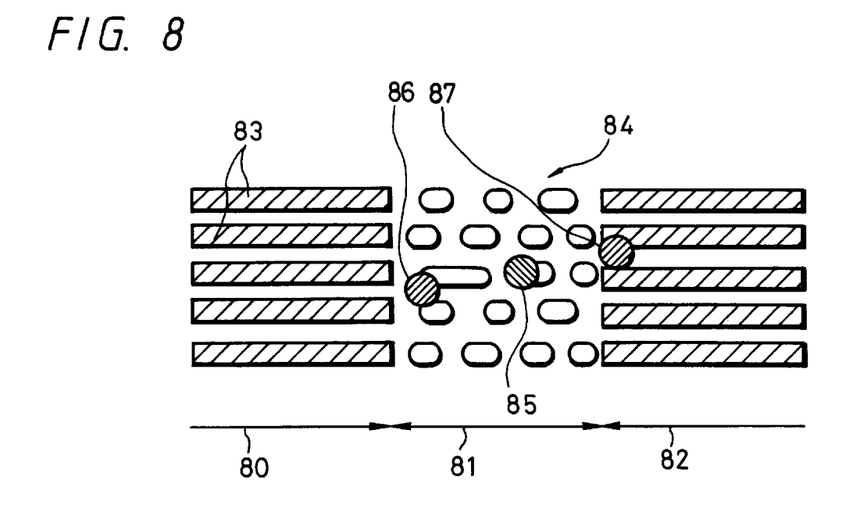
FIG. 8 is a diagram showing detection of disc tilt in the groove disc of the embodiment.

FIG. 8 is a diagram showing detection of disc tilt in a groove disc according to the embodiment. In the groove disc as shown in FIG. 8 composed of recording areas 80, 82 for recording an information signal only on a groove 83 and an address area 81 of embossed pit rows 84, when recording and reproducing an information signal by 3 spots, the DPP signal is detected from the groove 83 by using a main spot 85 and side spots 86, 87, and the DPD signal is detected from the address area 81 by using the main spot 85. By detecting the difference between the DPP signal and the DPD signal, the tilt of the disc with respect to the optical pickup can be detected.

Figure 9:
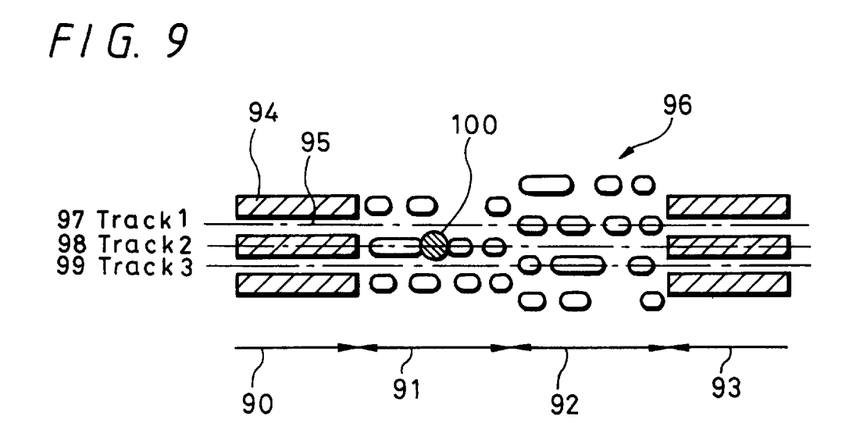
FIG. 9 is a diagram showing detection of disc tilt in a land and groove disc of the embodiment.

FIG. 9 is a diagram showing detection of disc tilt in a land and groove disc according to the embodiment. In the land and groove disc as shown in FIG. 9 composed of recording areas 90, 93 for recording an information signal on both lands 95 and grooves 94, and address areas A91, B92 of embossed pit rows 96, when recording an information signal by using one spot, at the time a main spot 100 passes through the address area A91 of a track (2) 98, the DPD signal and the push-pull signal $\{(A+D)-(B+C)\}$ are detected, and the values thereof are held. When the main spot 100 passes through a track (1) 97 and a track (3) 99, a signal corresponding to the push-pull signal $\{(E-F)+(G-H)\}$ obtained from the address area B92 is detected, and combined with the push-pull signal $\{(A+D)-(B+C)\}$ obtained from the held track (2) 98, and a DPP signal=$\{(A+D)-(B+C)\}+k\{(E-F)+(G-H)\}$ is generated, and the difference from the DPD signal is detected.

In the embodiment described above, by determining the difference between the DPP signal and the DPD signal, the radial tilt of the disc is detected, but instead of the DPP signal, by using the three-spot error signal, by obtaining the difference between the three-spot error signal and the DPD signal, the radial tilt of the disc may be detected. They may be selected arbitrarily depending on the type of the optical disc or the method of tracking of the optical disc device.

In the optical disc device, the ordinary reproducing operation is carried out as follows.

As shown in FIG. 1, the laser beam from the optical pickup of the optical system is irradiated on the optical disc 7 which is rotated by a spindle motor 101 servo-controlled by a spindle servo system of a servo circuit. Though not shown, after turning on the focus servo controlled by the focus servo system, a driving signal from the tracking servo system of the servo circuit is amplified by an amplifier, and applied to the tracking coil of the biaxial actuator of the optical pickup of the optical system, and while the actuator is moving in the track direction, the detection signal is detected from the photo detector 13 of the optical system by the reflected light from the optical disc 7.

The tracking error signal generated by the servo circuit is amplified by the amplifier to be a tracking actuator drive signal, and is applied to the tracking coil of the biaxial actuator of the optical pickup of the optical system.

In the optical pickup of the optical system, the objective lens is moved independently by the biaxial actuator using electromagnetic force in the focus direction (direction approaching or departing from the optical disc 7) and tracking direction (direction crossing the track of the optical disc).

The optical pickup of this optical system is sequentially moved in the outer circumferential direction of the optical disc 7 in synchronism with the rotation of the optical disc 7 by a slide (sled) motor not shown, and thereby the irradiation position of the laser beam is displaced in the outer circumferential direction of the optical disc 7 sequentially.

Incidentally, an RF amplifier generates a reproduced RF signal from reflected the light on the optical disc 7. The reproduced RF signal is demodulated in a data signal processor, subjected to the error correction processing after an error correction code being detected, and then subjected to deinterleaving process and to EFM PLUS demodulating process. Then, the demodulated signal is amplified to a level capable of being output, and is output.

In this embodiment, in order that the spindle motor 101 rotates about a fulcrum point 104 in the radial direction, a tilt control motor 102 is provided for controlling the tilt angle, and this till control motor 102 is driven by a differential signal between the DPP signal and the DPD signal. The tilt controller is not limited to this embodiment, but may be designed to control the tilt angle of the light spot with respect to the optical disc 7, by disposing a title angle correction unit for controlling the tilt angle on the optical pickup.

The controller generates, on the basis of the RF signal from the RF amplifier, a control signal to be transmitted to the servo circuit a control signal for setting the gain to be sent to the gain setting unit of the servo controller or the like, and also controls the signal process in the data signal processing unit and the operations of the respective parts.

The operation of the disc tilt detection is carried out as follows.

In the first place, when the controller recognizes that the optical disc 7 is inserted into a specified position of the device, it instructs start of focus servo and spindle servo.

More specifically, a laser beam emitted from the optical pickup of the optical system is irradiated on the optical disc 7 rotated by the spindle motor servo-controlled by the spindle servo system of the servo circuit. The focus servo is carried out by the focus coil of the biaxial actuator of the optical system controlled by the focus servo system of the servo circuit.

The controller detects the radial tilt of the disc. More specifically, the reflected light from the optical disc is detected by the detector 13 of the servo signal detection system 9, and the DPP signal and the DPD signal are generated by using detection signals from the detectors A to H, and the difference between the DPP signal and the DPD signal is calculated, and then the disc tilt is calculated.

The controller corrects the tilt angle by means of a tilt angle correction unit in the servo unit. More specifically, the tilt angle is corrected in each one of the media corresponding to the optical disc drive system.

When detecting the radial tilt of the disc, the sled position is changed. More specifically, by moving the optical pickup of the optical system sequentially in the outer circumferential direction of the optical disc 7 in synchronism with the rotation of the optical disc 7 by means of slide (sled) motor not shown, the irradiation position of the laser beam is displaced in the outer circumferential direction of the optical disc 7 sequentially.

The optical disc inclination detecting method according to the embodiment is an optical disc inclination detecting method in which the inclination angle of the optical disc 7 with respect to a light spot is detected in order that information is recorded or information is reproduced by irradiating a light spot on the optical disc 7 by the optical pickup, comprising the steps of dividing the light spot into the main spot 27 and both side spots 22, 30 in a specified track and track crossing directions before and after the same, generating, from the reflected light from the optical disc 7, a DPP signal as a first signal by subtracting or adding the detection signals from respective split photo detectors A to H of the main spot 27 and both side spots 22, 30 or in the track crossing direction of both side spots 22, 30, generating a DPD signal as a second signal by comparing the phase of the detection signals from the split photo detectors A to D in the direction orthogonal to the track crossing direction of the main spot 27, determining a differential operation value of the first signal and the second signal, and detecting the inclination angle of the optical disc on the basis of the differential operation value. Thus, since the radial tilt angle of the optical disc with respect to the optical pickup can be detected automatically by obtaining the difference between the first signal and the second signal without any adjusting particularly, the optical pickup or optical disc can be corrected to an optimum angle when correcting the inclination of the optical pickup or disc by using the radial tilt servo.

According to the optical disc inclination detecting method of the embodiment, in the above-described method, the first signal is a DPP (differential push-pull) signal obtained from detection signals of the main spot and the both side spots or a three-spot error signal obtained from detection signals of the both side spots, and the second signal is a DPD (differential phase detection) signal obtained from the detection signal of the main spot, so that by using the signal used in tracking in each optical disc, the disc tilt can be detected without using any additional circuit.

According to the optical disc inclination detecting method of the embodiment in the above-mentioned method, when recording and reproducing information by using the main spot 70 and the both side spots 71, 72 on the optical disc composed of pit rows on the entire surface, the difference between the DPP signal as the first signal obtained from the main spot 70 and the DPD signal as the second signal obtained from the both side spots 71, 72 is detected, so that the disc tilt can be detected easily and securely in reproduction of a read-only disc composed of pit rows on the entire surface.

According to the optical disc inclination detecting method of the embodiment, when recording and reproducing information by using the main spot 85 and the both side spots 80, 82 in the optical disc composed of the recording areas 80, 82 for recording information only in the grooves 83, and the address area 81 of embossed pit rows 84, by detecting the DPP signal as the first signal from the recording areas 80, 82 and detecting the DPD signal as the second signal from the address area 81, therefore the disc tilt can be detected easily and securely in the case of recording and reproducing information by using three spots in the groove disc composed of the recording areas for recording information signals only in the grooves and the address areas of embossed pit rows.

Also, according to the optical disc inclination detecting method of the embodiment, when recording and reproducing information by using the main spot 100 only in the optical disc composed of the recording areas 90, 93 for recording information in both the lands 95 and grooves 94, and the address areas A91, B92 of the embossed pit rows 96, by detecting a push-pull signal {(A+D)−(B+C)} of the main spot 100 used in generation of the DPD signal as the second signal and the DPP signal as the first signal in the address area A91 as the first address area of a specified track, holding the values of the DPD signal as the second signal and the push-pull signal of the main spot 100, detecting a push-pull signal {(E−F)+(G−H)} of the both side spots for use in generation of the DPP signal as the first signal obtained from the second address area B92 as the second address area in both tracks before and after the specified track, generating the first signal by combining the push-pull signal of the main spot obtained from the specified track and the push-pull signal of the both side steps, and detecting the difference between the first signal and the second signal, therefore the disc tilt can be detected easily and securely in the case of recording and reproducing information by using one spot in the land and groove disc composed of the recording areas for recording the information signal in both the lands and grooves and the address areas A, B of embossed pit rows.

The optical pickup device of the embodiment is an optical pickup device for detecting the inclination angle of an optical disc with respect to a light spot, for recording information or reproducing information by irradiating a laser spot on the optical disc 7, comprising an inclination angle detecting unit in which the light spot is divided into a main spot and both side spots in a specified track and in the track crossing direction before and after the same, a first signal is generated from the reflected light from the optical disc by subtracting or adding the detection signals from split photo detectors of the main spot and both side spots or in the track crossing direction of both side spots, a second signal is generated by comparing the phases of the detection signals from the split photo detectors in the direction orthogonal to the track crossing direction of the main spot, a differential operation value of the first signal and the second signal is obtained, and the inclination angle of the optical disc is detected on the basis of the differential operation value, and a correcting unit which corrects the inclination angle of the optical disc with respect to the light spot depending on the inclination angle, and therefore since the radial tilt angle of the optical disc with respect to the optical pickup can be detected automatically by determining the difference between the first signal and the second signal without adjusting particularly, the optical pickup or optical disc can be corrected to an optimum angle when correcting the inclination of the optical pickup or disc by using the radial tilt servo, and moreover since the radial tilt sensor is not necessary, the optical pickup can be reduced in size.

The optical disc device of the embodiment is an optical disc device for detecting the inclination angle of an optical disc with respect to a light spot, for recording information or reproducing information by irradiating a laser spot on the optical disc by an optical pickup, comprising an inclination angle detecting unit in which the light spot is divided into a main spot and both side spots in a specified track and in the track crossing direction before and after the same, a first signal is generated from the reflected light from the optical disc by subtracting or adding the detection signals from split photo detectors or light receiving units of the main spot and both side spots or in the track crossing direction of both side spots, a second signal is generated by comparing the phases of the detection signals from the split photo detectors in the direction orthogonal to the track crossing direction of the main spot, a differential operation value of the first signal and the second signal is obtained, and the inclination angle of the optical disc is detected on the basis of the differential operation value, and a correcting unit which corrects the inclination angle of the optical disc with respect to the light spot depending on the inclination angle, and therefore the optical pickup or optical disc can be corrected to an optimum angle when correcting the optical pickup or optical disc by using the radial tilt servo, and the radial tilt sensor is not necessary, so that the optical pickup and the optical disc device can be reduced in size.

The foregoing embodiments relate only to application of detection of radial tilt of the optical disc device, but it may be applied also in the radial tilt detecting device of a card reading apparatus of other electronic appliances having a hard disc or other plate-shaped memory media.

The optical disc inclination detecting method of the invention is an optical disc inclination detecting method for detecting the inclination angle of the optical disc with respect to a light spot, for recording information or reproducing information by irradiating a light spot on the optical disc by the optical pickup, comprising the steps of dividing the light spot into the main spot and both side spots in a specified track and track crossing directions before and after the same, generating, from the reflected light from the optical disc, a first signal by subtracting or adding the detection signals from split photo detectors of the main spot and both side spots or in the track crossing direction of both side spots, generating a second signal by comparing the phases of the detection signals from the split photo detectors in the direction orthogonal to the track crossing direction of the main spot, determining a differential operation value of the first signal and the second signal, and detecting the inclination angle of the optical disc on the basis of the differential operation value, and therefore since the radial tilt angle of the optical disc with respect to the optical pickup can be detected automatically by determining the differential operation value of the first signal and the second signal without adjusting particularly, the optical pickup or optical disc can be corrected to an optimum angle when correcting the inclination of the optical pickup or disc by using the radial tilt servo.

According to the optical disc inclination detecting method of the invention, in the above-mentioned method, the first signal is a three-spot error signal obtained from a DPP (differential push-pull) signal obtained from detection signals of the main spot and the both side spots, or detection signals of the both side spots, and the second signal is a DPD (differential phase detection) signal obtained from the detection signal of the main spot, and therefore by using the signal used in tracking in each optical disc, the disc tilt can be detected without using any additional circuit.

Also, according to the optical disc inclination detecting method of the invention, in the method mentioned above, when recording and reproducing information by using the main spot and the both side spots in the optical disc composed of pit rows on the entire surface, the difference between the first signal obtained from the main spot and the second signal obtained from the both side spots is detected, so that the disc tilt can be detected easily and securely in reproduction of a read-only disc composed of pit rows on the entire surface.

In the optical disc inclination detecting method of the invention, when recording and reproducing information by using the main spot and the both side spots in the optical disc composed of recording areas for recording information only in grooves, and the address areas of embossed pit rows, since the first signal is detected from the recording areas and the second signal is detected from the address areas, the disc tilt can be detected easily and securely in the case of recording and reproducing information by using three spots in the groove disc composed of the recording areas for recording information signals only in the grooves and the address areas of embossed pit rows.

Further, according to the optical disc inclination detecting method of the invention, when recording and reproducing information by using the main spot only in the optical disc composed of the recording areas for recording information in both lands and grooves, and the address areas of embossed pit rows, by detecting a push-pull signal of the main spot used in generation of the second signal and the first signal in the address area as the first address area of a specified track, holding the values of the second signal and the push-pull signal of the main spot, detecting a push-pull signal of the both side spots for use in generation of the first signal obtained from the second address area as the second address area in both tracks before and after the specified track, generating the first signal by combining the push-pull signal of the main spot obtained from the specified track and the push-pull signal of the both side spots, and detecting the difference between the first signal and the second signal, therefore the disc tilt can be detected easily and securely in the case of recording and reproducing information by using one spot in the land and groove disc composed of the recording areas for recording information signals in both lands and grooves and the address areas A, B of embossed pit rows.

The optical pickup device of the invention is an optical pickup device for detecting the inclination angle of an optical disc with respect to a light spot, for recording information or reproducing information by irradiating a laser spot on the optical disc, comprising an inclination angle detecting unit in which the light spot is divided into a main spot and both side spots in a specified track and in the track crossing direction before and after the same, a first signal is generated from the reflected light from the optical disc by subtracting or adding the detection signals from split photo detectors of the main spot and both side spots or in the track crossing direction of both side spots, a second signal is generated by comparing the phases of the detection signals from the split photo detectors in the direction orthogonal to the track crossing direction of the main spot, a differential operation value of the first signal and the second signal is determined, and the inclination angle of the optical disc is detected on the basis of the differential operation value, and a correcting unit which corrects the inclination angle of the optical disc with respect to the light spot depending on the inclination angle, and therefore since the radial tilt angle of the optical disc with respect to the optical pickup can be detected automatically by determining the difference between the first signal and the second signal without adjusting particularly, the optical pickup or optical disc can be corrected to an optimum angle when correcting the inclination of the optical pickup or disc by using the radial tilt servo, and moreover since the radial tilt sensor is not necessary, the optical pickup can be reduced in size.

The optical disc device of the invention is an optical disc device for detecting the inclination angle of an optical disc with respect to a light spot, for recording information or reproducing information by irradiating a laser spot on an optical disc by an optical pickup, comprising an inclination angle detecting unit in which the light spot is divided into a main spot and both side spots in a specified track and in the track crossing direction before and after the same, a first signal is generated from the reflected light from the optical disc by subtracting or adding the detection signals from split photo detectors of the main spot and both side spots or in the track crossing direction of both side spots, a second signal is generated by comparing the phases of the detection signals from the split photo detectors in the direction orthogonal to the track crossing direction of the main spot, a differential operation value of the first signal and the second signal is determined, and the inclination angle of the optical disc is detected on the basis of the differential operation value, and a correcting unit which corrects the inclination angle of the optical disc with respect to the light spot depending on the inclination angle, and-therefore the optical pickup or optical disc can be corrected to an optimum angle when correcting the inclination of the optical pickup or optical disc by using the radial tilt servo, and the radial tilt sensor is not necessary, so that the optical pickup and the optical disc device can be reduced in size.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An optical disc inclination detecting method for detecting an inclination angle of an optical disc with respect to a light spot, for recording information or reproducing information by irradiating the light spot on the optical disc by an optical pickup, comprising:

dividing said light spot into a main spot and both side spots in a specified track and track crossing directions before and after said specified track;

detecting signals corresponding to a reflected light from said optical disc by photo detectors corresponding to said main spot and said both side spots;

generating a DPP (differential push-pull) signal from the signals corresponding to the main spot and said both side spots;

generating a DPD (differential phase direction) signal by comparing phases from signals corresponding to the main spot;

determining a differential operation value of said DPP and DPD signals; and detecting the inclination angle of said optical disc based on said differential operation value.

2. The optical disc inclination detecting method as claimed in claim 1, further comprising:

detecting a three-spot error signal obtained from signals corresponding to said both side spots.

3. The optical disc inclination detecting method as claimed in claim 1, wherein when recording and reproducing information by using said main spot and said both side spots in said optical disc composed of pit rows on an entire surface, a difference between said DPD signal obtained from said main spot and s aid DPP signal obtained from said main spot and said both side spots is detected.

4. The optical disc inclination detecting method according to claim 1, further comprising, when recording and reproducing information by using said main spot and said both side spots in said optical disc composed of a recording area for recording information only in a groove, and an address area of an embossed pit row, detecting said DPP signal in said recording area; and detecting said DPD signal in said address area.

5. The optical disc inclination detecting method according to claim 1, further comprising, when recording and reproducing information by using said main spot only in said optical disc composed of a recording area for recording information in both a land and a groove, and an address area of an embossed pit row, detecting said DPD signal in a first address area of a specified track;

detecting a push-pull signal from said main spot for use in generation of a first signal in said first address area of said specified track;

holding values of said DPD signal and the push-pull signal generated by said main spot;

detecting a push-pull signal generated from said both side spots for use in generation of a first signal obtained from a second address area in both tracks before and after said specified track;

generating said first signal by combining the push-pull signal of said main spot obtained from said specified track and the push-pull signal of said both side spots; and detecting a difference between said first signal and said second signal.

6. An optical disc inclination controlling method for controlling an inclination angle of an optical disc with respect to a light spot, for recording information or reproducing information by irradiating the light spot on the optical disc by an optical pickup, comprising:

detecting signals corresponding to a reflected light from said optical disc by light receiving units corresponding to said main spot and said both side spots;

generating a DPP (differential push-pull) signal from the signals corresponding to the main spot and said both side spots;

generating a DPD (differential phase direction) signal by comparing phases from signals corresponding to the main spot;

determining a differential operation value between said DPP and DPD signals;

detecting the inclination angle of said optical disc based on said differential operation value; and applying an inclination detection signal obtained in said optical disc inclination detecting to a tilt control means.

7. An optical pickup device for detecting an inclination angle of an optical disc with respect to a light spot, for recording information or reproducing information by irradiating the laser spot on the optical disc, comprising:

a means for dividing said light spot into a main spot positioned on a specified track and both side spots positioned in a track crossing direction before and after said specified track;

a light receiving means including a light receiving unit for receiving a reflected light from said optical disc corresponding to the main spot and light receiving units for receiving a reflected light corresponding to said both side spots;

a first signal generating means for generating a DPP (differential push-pull) signal from the signals corresponding to the main spot and said both side spots;

a second signal generating means for generating a DPD (differential phase direction) signal by comparing phases from the signals corresponding to the main spot; and an inclination angle detecting means for detecting an inclination angle of said optical disc based on a differential operation value between said DPP and DPD signals.

8. An optical pickup device for controlling an inclination angle of an optical disc with respect to a light spot, for recording information or reproducing information by irradiating the laser spot on the optical disc, comprising:

a means for dividing said light spot into a main spot positioned on a specified track and both side spots positioned in a track crossing direction before and after said specified track;

a light receiving means including a light receiving unit for receiving a reflected light corresponding to the main spot from said optical disc and light receiving units for receiving a reflected light corresponding to said both side spots;

a first signal generating means for generating a DPP signal from the signals corresponding to the main spot and said both side spots;

a second signal generating means for generating a DPD (differential phase direction) signal by comparing phases from signals corresponding to the main spot;

an inclination angle detecting means for detecting the inclination angle of said optical disc based on a differential operation value between said DPP and DPD signals; and a correcting means for correcting the inclination angle of said optical disc with respect to said light spot depending on said inclination angle.

9. An optical device for controlling an inclination angle of an optical disc with respect to a light spot, for recording information or reproducing information by irradiating the laser spot on the optical disc, comprising:

a means for dividing said light spot into a main spot positioned on a specified track and both side spots positioned in a track crossing direction before and after said specified track;

a light receiving means including a light receiving unit for receiving a reflected light corresponding to the main spot from said optical disc and light receiving units for receiving a reflected light corresponding to said both side spots;

a first signal generating means for generating a DPP (differential push-pull) signal from the signals corresponding to the main spot and said both side spots;

a second signal generating means for generating a DPD (differential phase direction) signal by comparing phases from signals corresponding to the main spot;

an inclination angle detecting means for detecting the inclination angle of said optical disc based on a differential operation value between said DPP and DPD signals; and a correcting means for correcting the inclination angle of said optical disc with respect to said light spot depending on said inclination angle.

10. An optical pickup device for controlling an inclination angle of an optical disc with respect to a light spot, for recording information or reproducing information by irradiating the laser spot on the optical disc, comprising:

a dividing unit configured to divide said light spot into a main spot positioned on a specified track and both side spots positioned in a track crossing direction before and after said specified track;

a light receiving unit configured to receive a reflected light corresponding to the main spot from said optical disc and light receiving units configured to receive a reflected light corresponding to both side spots;

a first signal generator configured to generate a DPP (differential push-pull) signal from the signals corresponding to the main spot and said both side spots;

a second signal generator configured to generate a DPD (differential phase direction) signal by comparing phases from signals corresponding to the main spot; and an inclination angle detecting unit configured to detect the inclination angle of said optical disc based on a differential operation value between said DPP and DPD signals; and a correcting unit configured to correct the inclination angle of said optical disc with respect to said light spot depending on said inclination angle.

* * * * *